United States Patent
Wu et al.

(10) Patent No.: US 11,703,960 B2
(45) Date of Patent: Jul. 18, 2023

(54) AIR MOUSE MODE IMPLEMENTATION METHOD AND RELATED DEVICE

(71) Applicant: Huawei Technologies Co., Ltd., Shenzhen (CN)

(72) Inventors: Lianqi Wu, Wuhan (CN); Yixiu Hao, Shenzhen (CN); Xudong Tian, Wuhan (CN); Puyao Qiao, Wuhan (CN); Bin Liu, Wuhan (CN); Jinming Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/616,839

(22) PCT Filed: Jun. 5, 2020

(86) PCT No.: PCT/CN2020/094614
§ 371 (c)(1),
(2) Date: Dec. 6, 2021

(87) PCT Pub. No.: WO2020/244623
PCT Pub. Date: Dec. 10, 2020

(65) Prior Publication Data
US 2022/0308679 A1    Sep. 29, 2022

(30) Foreign Application Priority Data

Jun. 6, 2019 (CN) .......................... 201910500659.6

(51) Int. Cl.
G06F 3/0346    (2013.01)
G06F 3/0354    (2013.01)
(Continued)

(52) U.S. Cl.
CPC ........ *G06F 3/0346* (2013.01); *G06F 3/03545* (2013.01); *G06F 3/0484* (2013.01); *G06F 3/1454* (2013.01)

(58) Field of Classification Search
CPC .... G06F 3/033; G06F 3/03545; G06F 3/0346; G06F 3/0383; G06F 2203/0384
(Continued)

(56) References Cited

U.S. PATENT DOCUMENTS 8,965,729 B2 * 2/2015 Bang .................... G06F 3/03545
                                                     702/141
9,201,523 B1 * 12/2015 Hwang ................. G06F 3/0346
(Continued)

FOREIGN PATENT DOCUMENTS

CN    202004828 U    10/2011
CN    103853348 A    6/2014
(Continued)

*Primary Examiner* — Koosha Sharifi-Tafreshi
(74) *Attorney, Agent, or Firm* — Conley Rose, P.C.

(57) ABSTRACT

An air mouse mode implementation method includes establishing, by an electronic device, a communication connection to a stylus through BLUETOOTH, sending, by the electronic device, notification information to the stylus through the communication connection when detecting a screen casting event of the electronic device, where the notification information instructs to enter an air mouse mode, receiving, by the electronic device, a determining instruction from the stylus through the communication connection, entering, by the electronic device, the air mouse mode based on the determining instruction, and modifying, from an arrow icon to a dot icon and by the electronic device, an indication icon corresponding to the stylus.

20 Claims, 7 Drawing Sheets

(51) Int. Cl.
  *G06F 3/0484*  (2022.01)
  *G06F 3/14*  (2006.01)
(58) Field of Classification Search
  USPC .................. 345/157, 158, 169, 179; 715/754
  See application file for complete search history.

(56) References Cited

U.S. PATENT DOCUMENTS

| | | |
|---|---|---|
| 2016/0092031 A1 | 3/2016 | Chen |
| 2016/0139690 A1* | 5/2016 | Chang .................. G06F 3/0338 345/179 |
| 2018/0364902 A1 | 12/2018 | Yang |
| 2022/0308679 A1 | 9/2022 | Wu et al. |

FOREIGN PATENT DOCUMENTS

| | | |
|---|---|---|
| CN | 105786360 A | 7/2016 |
| CN | 106444983 A | 2/2017 |
| CN | 206193588 U | 5/2017 |
| CN | 107272998 A | 10/2017 |
| CN | 206639192 U | 11/2017 |
| CN | 207625614 U | 7/2018 |
| CN | 208239991 U | 12/2018 |
| CN | 110347269 A | 10/2019 |
| EP | 3226108 A1 | 10/2017 |
| KR | 20160137274 A | 11/2016 |

\* cited by examiner

AIR MOUSE MODE IMPLEMENTATION METHOD AND RELATED DEVICE

CROSS-REFERENCE TO RELATED APPLICATIONS

This is a U.S. National Stage of International Patent Application No. PCT/CN2020/094614 filed on Jun. 5, 2020, which claims priority to Chinese Patent Application No. 201910500659.6 filed on Jun. 6, 2019. Both of the aforementioned applications are hereby incorporated by reference in their entireties.

TECHNICAL FIELD

This application relates to the field of electronic technologies, and in particular, to an air mouse mode implementation method and a related device.

BACKGROUND

With development of a terminal, screen casting is applied to more scenarios, for example, video playing, PowerPoint (PowerPoint, PPT) presentation/word playing in a conference. Lightweight office is required by some users. For a terminal (for example, a large-screen mobile phone or a tablet computer) equipped with a stylus, the stylus may operate a system instead of a mouse, and may complete an input. However, when display content of the terminal is cast on a large screen, a function of the stylus does not meet all operation requirements, and a content casting operation is inconvenient.

SUMMARY

Embodiments of this application provide an air mouse mode implementation method and a related device, to improve operation convenience.

According to a first aspect, an embodiment of this application discloses an air mouse mode implementation method, including: An electronic device establishes a communication connection to a stylus through Bluetooth; sends notification information to the stylus through the communication connection when detecting a screen casting event of the electronic device, where the notification information is used to indicate whether the stylus is to enter an air mouse mode; receives a determining instruction sent by the stylus through the communication connection; and enters the air mouse mode based on the determining instruction, and modifies, from an arrow icon to a dot icon, an indication icon corresponding to the stylus. After the stylus is controlled to enter the air mouse mode in this manner, the stylus may implement a function of a laser pen, and is applicable to a lightweight office scenario. A user may operate, by using the stylus, display content, or the like on the electronic device, and all operation effects can be truly reflected on a large display, to improve operation convenience of the user.

In a possible design, the electronic device receives a page turning instruction sent by the stylus through the communication connection; and performs page turning on a current page of a screen casting interface based on the page turning instruction. The stylus is used to implement a page turning function, to improve operation convenience.

In another possible design, the electronic device receives a marking instruction sent by the stylus through the communication connection; and marks display content of the screen casting interface based on the marking instruction. The stylus is used to implement a marking function, to improve operation convenience.

In another possible design, when detecting that the screen casting event ends, the electronic device exists the air mouse mode, and modifies, from the dot icon to the arrow icon, the indication icon corresponding to the stylus. In this way, a working mode of the stylus is automatically switched.

In another possible design, the electronic device receives a switching instruction sent by the stylus through the communication connection; and exits the air mouse mode, and modifies, from the dot icon to the arrow icon, the indication icon corresponding to the stylus. In this way, a working mode of the stylus is automatically switched.

According to a second aspect, an embodiment of this application discloses an air mouse mode implementation method, including: A stylus establishes a communication connection to an electronic device through Bluetooth; receives notification information sent by the electronic device through the communication connection, where the notification information is used to indicate whether the stylus is to enter an air mouse mode, and the notification information is sent by the electronic device when the electronic device detects a screen casting event; and sends a determining instruction to the electronic device through the communication connection, where the determining instruction is used to indicate the electronic device to enter the air mouse mode, and to modify, from an arrow icon to a dot icon, an indication icon corresponding to the stylus. After the stylus is controlled to enter the air mouse mode in this manner, the stylus may implement a function of a laser pen, and is applicable to a lightweight office scenario. A user may operate, by using the stylus, display content, or the like on the electronic device, and all operation effects can be truly reflected on a large display, to improve operation convenience of the user.

In a possible design, the stylus sends a page turning instruction to the electronic device through the communication connection. The page turning instruction is used to indicate the electronic device to perform page turning on a current page of a screen casting interface. The stylus is used to implement a page turning function, to improve operation convenience.

In another possible design, the stylus sends a marking instruction to the electronic device through the communication connection. The marking instruction is used to indicate the electronic device to mark display content of a screen casting interface. The stylus is used to implement a marking function, to improve operation convenience.

In another possible design, after receiving the notification information, the stylus may determine whether there is a screen casting event, and send the determining instruction to the electronic device if there is a screen casting event.

In another possible design, the stylus sends a switching instruction to the electronic device through the communication connection. The switching instruction is used to indicate the electronic device to exit the air mouse mode, and to modify, from the dot icon to the arrow icon, the indication icon corresponding to the stylus. In this way, a working mode of the stylus is automatically switched.

According to a third aspect, an embodiment of this application provides an air mouse mode implementation apparatus. The air mouse mode implementation apparatus is configured to implement the method and function performed by the electronic device in the first aspect, and is implemented by using hardware/software. The hardware/software of the air mouse mode implementation apparatus includes a module corresponding to the foregoing function.

According to a fourth aspect, an embodiment of this application provides an air mouse mode implementation apparatus. The air mouse mode implementation apparatus is configured to implement the method and function performed by the stylus in the second aspect, and is implemented by using hardware/software. The hardware/software of the air mouse mode implementation apparatus includes a module corresponding to the foregoing function.

According to a fifth aspect, an embodiment of this application provides an electronic device, including a processor, a memory, and a communications bus. The communications bus is configured to implement a connection and communication between the processor and the memory, and the processor executes a program stored in the memory, to implement steps in the first aspect.

In a possible design, the electronic device provided in this application may include a module corresponding to behavior of the electronic device in the foregoing method designs. The module may be software and/or hardware.

According to a sixth aspect, an embodiment of this application provides a stylus, including a processor, a memory, and a communications bus. The communications bus is configured to implement a connection and communication between the processor and the memory, and the processor executes a program stored in the memory, to implement steps in the second aspect.

In a possible design, the stylus provided in this application may include a module corresponding to behavior of the stylus in the foregoing method designs. The module may be software and/or hardware.

According to a seventh aspect, this application provides a computer-readable storage medium. The computer-readable storage medium stores instructions, and when the instructions are run on a computer, the computer is enabled to perform the method according to the foregoing aspects.

According to an eighth aspect, this application provides a computer program product including instructions. When the computer program product runs on a computer, the computer is enabled to perform the method according to the foregoing aspects.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes the embodiments of this application with reference to the accompanying drawings in the embodiments of this application.

Figure 1:
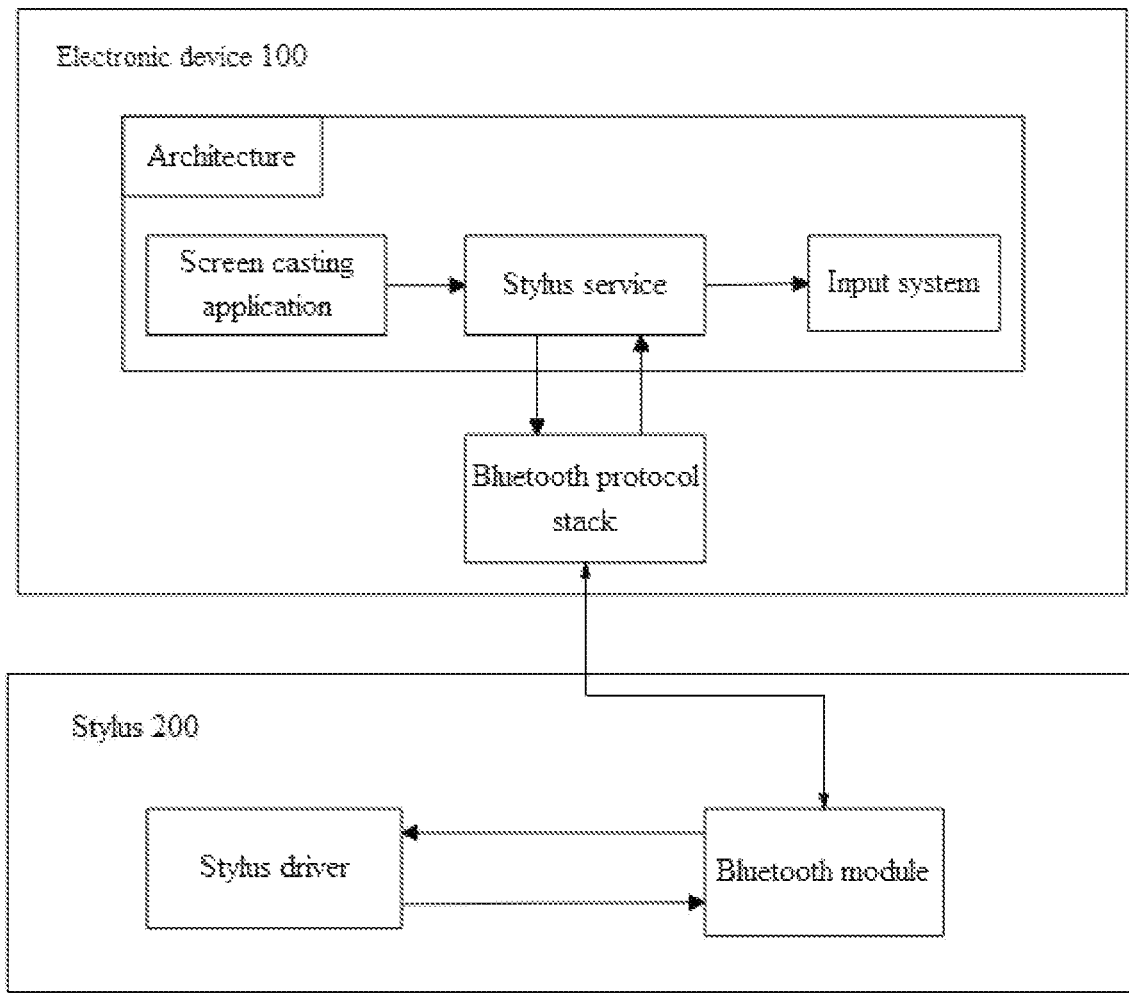
FIG. 1 is a schematic architectural diagram of an application system according to an embodiment of this application.

FIG. 1 is a schematic architectural diagram of an application system according to an embodiment of this application. The application system may include an electronic device 100 and a stylus 200. The electronic device 100 may be a mobile phone, a handheld computing device, a personal digital assistant (personal digital assistant, PDA), a tablet computer, or the like. The electronic device 100 may include a module such as a screen casting application, a stylus server, an input system, a Bluetooth protocol stack, or the like. The stylus 200 may include a stylus driver, a Bluetooth module, or the like. The electronic device 100 has a screen casting function. Display content on the electronic device 100 may be cast on a large screen, so that a user can view, on the large screen, the content on the electronic device 100. The stylus 200 is associated with the electronic device 100, and the display content on the electronic device 100 may be operated by using the stylus 200.

Figure 2:
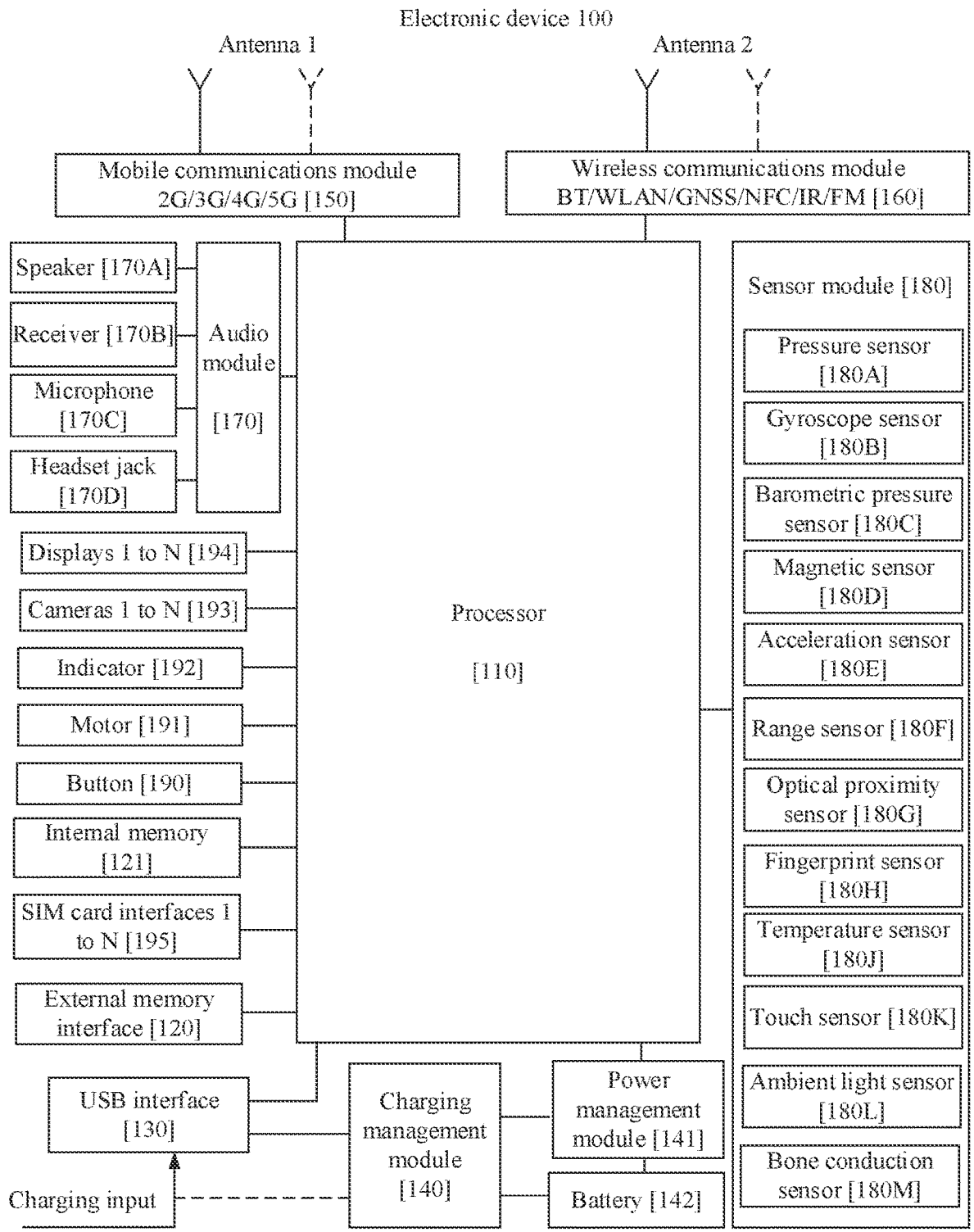
FIG. 2 is a schematic diagram of a structure of an electronic device according to an embodiment of this application.

FIG. 2 is a schematic diagram of a structure of an electronic device according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or may have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU). Different processing units may be independent devices, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be specifically a mini USB interface, a micro USB interface, a USB Type-C interface, or the like. The USB interface 130 may be configured to connect to a charger for charging the electronic device 100, or may be configured to transmit data between the electronic device 100 and a peripheral device, or may be configured to connect to a headset for playing audio through the headset, or may be configured to connect to another electronic device, for example, an AR device.

It can be understood that an interface connection relationship between the modules in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area network, WLAN), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of encoding formats, for example, a moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The electronic device 100 may implement applications such as intelligent cognition through the NPU, for example, image recognition, facial recognition, speech recognition, and text understanding.

The external memory interface 120 may be configured to connect to an external memory card such as a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function and an image playing function), and the like. The data storage area may store data (for example, audio data and a phone book) created when the electronic device 100 is used, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to implement various function applications and data processing of the electronic device 100.

The electronic device 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or listens to a voice message, the receiver 170B may be placed near a human ear to listen to a voice.

The microphone 170C, also referred to as a "mike", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to implement a noise reduction function in addition to a function of collecting a sound signal. In some other embodiments, three, four, or more microphones 170C may be alternatively disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform. OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device 100 determines pressure strength based on a change of the capacitance. When a touch operation is performed on the display 194, the electronic device 100 detects intensity of the touch operation based on the pressure sensor 180A. The electronic device 100 may also calculate a touch location based on a detection signal of the pressure sensor 180A. In some embodiments, touch operations performed on a same touch location but having different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on the icon of Messages, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, thereby implementing the image stabilization. The gyroscope sensor 180B may be further used in a navigation scenario and a motion-controlled gaming scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the flip cover is set based on a detected opening or closing state of the flip cover or a detected opening or closing state of the clamshell.

The acceleration sensor 180E may detect a magnitude of an acceleration of the electronic device 100 in each direction (usually, on three axes). When the electronic device 100 is still, a magnitude and a direction of gravity may be detected. The acceleration sensor may be further configured to identify a posture of the electronic device, and is used in an application such as switching between a landscape mode and a portrait mode or a pedometer.

The range sensor 180F is configured to measure a distance. The electronic device 100 may measure a distance in an infrared or a laser manner. In some embodiments, in a photographing scenario, the electronic device 100 may measure a distance by using the range sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects, by using the photodiode, infrared reflected light that comes from a nearby object. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, to automatically perform screen-off to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 1803. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats up the battery 142, to avoid abnormal shutdown of the electronic device 100 due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch component". The touch sensor 180K may be disposed on the display 194. The touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor, to determine a type of a touch event. A corresponding visual output may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part The bone conduction sensor 180M may also be in contact with a human pulse, and receive a blood pressure beating signal. In some embodiments, the bone conduction sensor 180M may also be disposed in the headset to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is also compatible with different types of SIM cards. The SIM card interface 195 is also compatible with an external storage card. The electronic device 100 interacts with a network by using the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A stylus 200 may have all or a part of a structure of the electronic device 100, and details are not described herein again.

Figure 3:
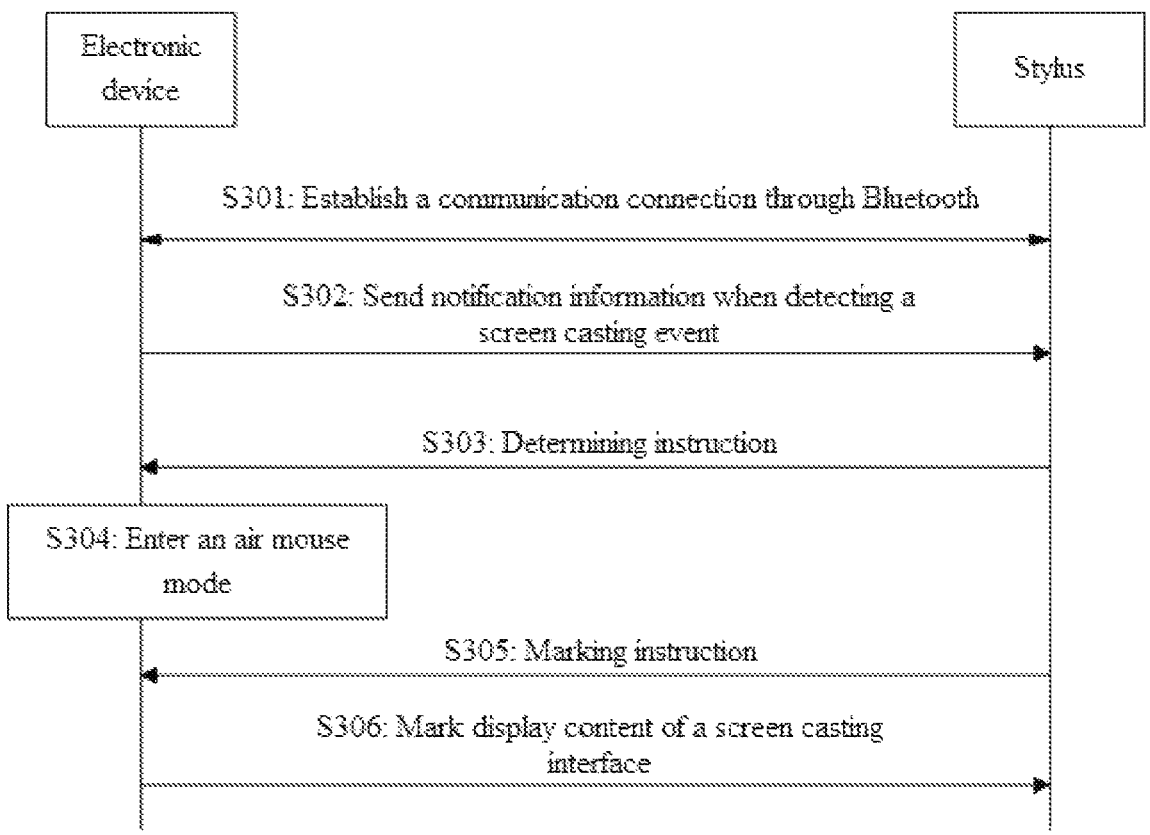
FIG. 3 is a schematic flowchart of an air mouse mode implementation method according to an embodiment of this application.

FIG. 3 is a schematic flowchart of an air mouse mode implementation method according to an embodiment of this application. The method includes but is not limited to the following steps.

S301: An electronic device establishes a communication connection to a stylus through Bluetooth.

In specific implementation, the electronic device and the stylus each have a Bluetooth module. The electronic device may enable a Bluetooth switch, scan for Bluetooth broadcast information, obtain device information of a stylus of the Bluetooth broadcast information, determine whether the device information meets a predetermined automatic connection condition, and establish the communication connection to the stylus if it is determined that the device information meets the automatic connection condition.

S302: The electronic device sends notification information to the stylus through the communication connection when detecting a screen casting event of the electronic device, where the notification information is used to indicate whether the stylus is to enter an air mouse mode. The stylus may receive the notification information sent by the electronic device.

In a specific implementation, the electronic device may detect whether the electronic device enables a screen casting application. If it is detected that the electronic device enables the screen casting application, the screen casting application may broadcast the screen casting event (for example, casting, on a background wall, a curtain, or a television screen, display content on the electronic device). After receiving the screen casting event, a stylus service module may send the notification information to a Bluetooth protocol stack, where the notification information may include the screen casting event, and then send the notification information to the stylus by using the Bluetooth protocol stack. The stylus receives the notification information by using the Bluetooth module, and transfers the notification information to a stylus driver.

S303: The stylus sends a determining instruction to the electronic device through the communication connection, and the electronic device receives the determining instruction sent by the stylus.

In specific implementation, after sending the notification information, the electronic device may cast the notification information on the background wall, the curtain, or the television screen, to prompt a user to determine whether to enter the air mouse mode. Alternatively, after receiving the notification message, the stylus prompts, by using an indicator of the stylus, the user to determine whether to enter the air mouse mode. If the user determines to enter the air mouse mode, the stylus may receive a determining instruction entered by the user, and send the determining instruction to the electronic device by using the Bluetooth module. If the user determines not to enter the air mouse mode, the stylus may receive a rejection instruction entered by the user, and send the rejection instruction to the electronic device by using the Bluetooth module. In this case, the electronic device may maintain an operation mode of the stylus, and keep an indication icon (an arrow icon) corresponding to the stylus unchanged.

Optionally, after receiving the notification information, the stylus may determine whether there is a screen casting event, and send the determining instruction to the electronic device if there is a screen casting event.

S304: The electronic device enters the air mouse mode based on the determining instruction, and modifies, from the arrow icon to a dot icon, the indication icon corresponding to the stylus.

In a specific implementation, after receiving, by using the Bluetooth protocol stack, the determining instruction sent by the stylus, the electronic device may transfer the determining instruction to the stylus service module. The stylus service module modifies a service parameter, and notifies an input system. The electronic device adjusts a working mode of the stylus to the air mouse mode based on the modified service parameter, and modifies, from the arrow icon to the dot icon, the indication icon corresponding to the stylus.

The electronic device may configure a color of the indication icon. For example, the arrow icon of the indication icon is black. After the electronic device enters the air mouse mode, the dot icon of the indication icon may be red, blue, green, or the like. The electronic device may further configure a shape of the indication icon. For example, the arrow icon of the indication icon is a hollow arrow icon. After the electronic device enters the air mouse mode, the dot icon of the indication icon may be a solid dot icon. It should be noted that the shape and the color of the indication icon may be configured in a plurality of manners based on an actual requirement. Details are not described in this step.

S305: The stylus may send a marking instruction to the electronic device through the communication connection, and the electronic device receives the marking instruction sent by the stylus.

S306: The electronic device marks display content of a screen casting interface based on the marking instruction.

Figure 4:
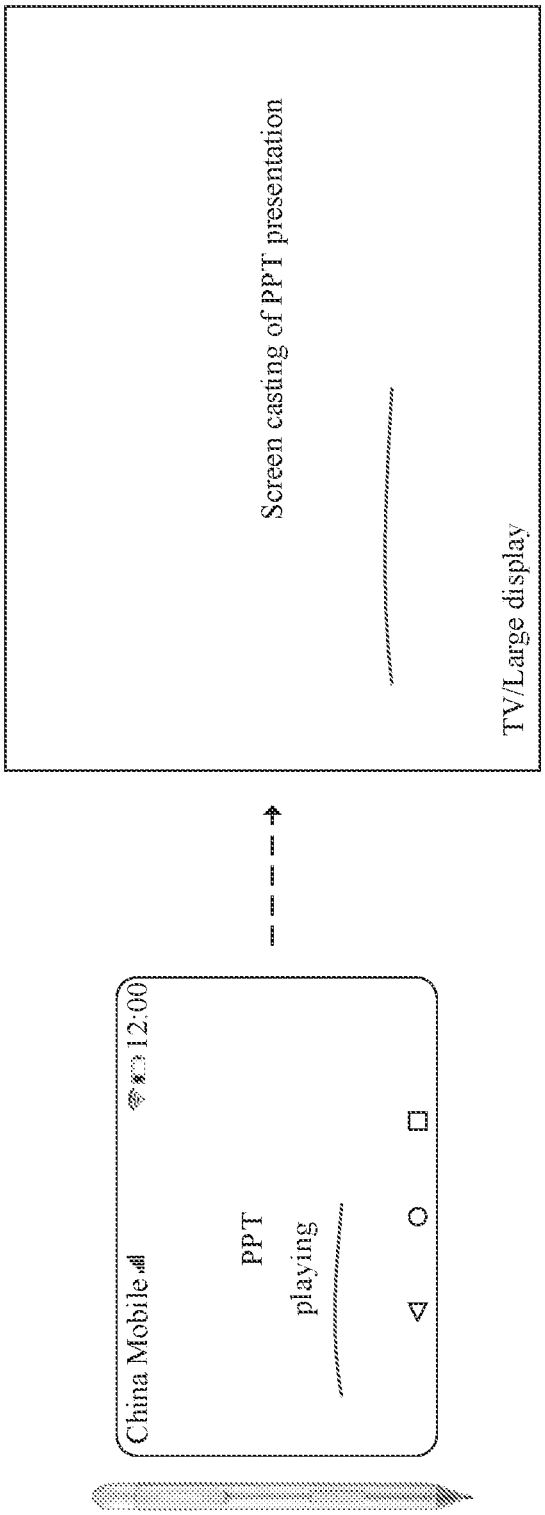
FIG. 4 is a schematic diagram of a content mark according to an embodiment of this application.

FIG. 4 is a schematic diagram of a content mark according to an embodiment of this application. When the electronic device plays PPT. PPT is cast on a large display. After the stylus enters the air mouse mode, the user may view PPT on the large display, and send the marking instruction to the electronic device by using the stylus. The stylus service module of the electronic device modifies the service parameter based on the marking instruction, and transfers the modified service parameter to the input system. Finally, the electronic device marks PPT in the screen casting interface, and casts PPT on the large display. A marking manner may include any marking manner such as drawing a horizontal line, drawing a circle, or drawing a key point.

Optionally, the stylus may send a page turning instruction to the electronic device through the communication connection, and the electronic device receives the page turning instruction sent by the stylus, and performs page turning on a current page of the screen casting interface based on the page turning instruction.

Figure 5:
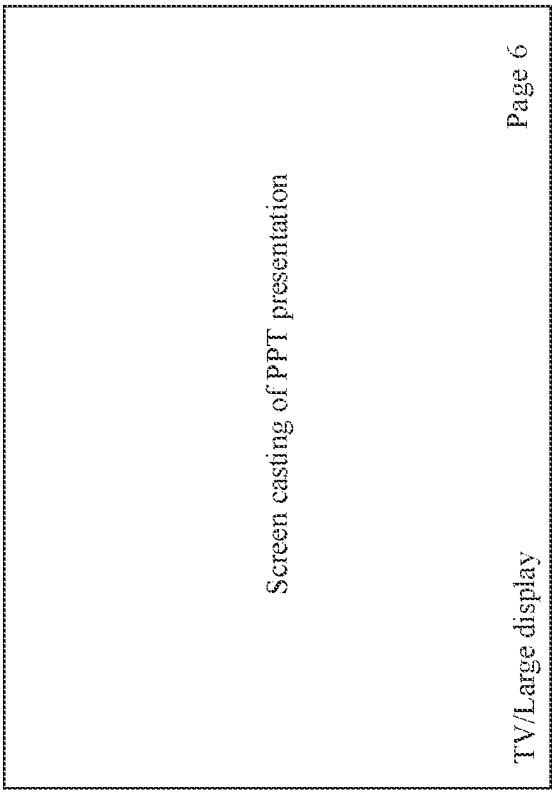
FIG. 5 is a schematic diagram of page turning display according to an embodiment of this application.
Figure 5:
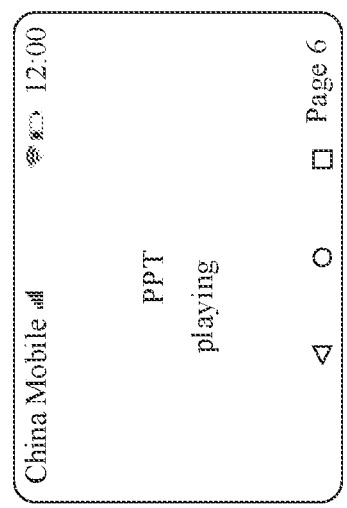

FIG. 5 is a schematic diagram of page turning display according to an embodiment of this application. When the electronic device plays PPT (for example, the current page is a page 5), PPT is cast on the large display. After the stylus enters the air mouse mode, the user may view PPT on the large display, and send the page turning instruction to the electronic device by using the stylus (for example, tapping a button on the stylus or sliding a button on the stylus). The stylus service module of the electronic device performs page turning on a PPT page in the screen casting interface based on the page turning instruction (for example, a page 6 is displayed after page turning), and casts the PPT page on the large display. A quantity of pages on which page turning is performed may be determined based on a quantity of times that the user taps the button on the stylus or a distance by which the user slides the button.

Optionally, when it is detected that the screen casting event ends, the stylus is controlled to exit the air mouse mode, the stylus is adjusted to an original working mode, and the indication icon corresponding to the stylus is modified from the dot icon to the arrow icon. Alternatively, the stylus may send a switching instruction to the electronic device through the communication connection, and the electronic device receives the switching instruction sent by the stylus, controls the stylus to exit the air mouse mode, and modifies, from the dot icon to the arrow icon, the indication icon corresponding to the stylus.

In this embodiment of this application, the stylus establishes the communication connection to the electronic device through Bluetooth. When the electronic device detects the screen casting event, the stylus is triggered to enter the air mouse mode, and the indication icon of the stylus is modified. After the stylus is controlled to enter the air mouse mode in this manner, the stylus may implement a function of a laser pen, for example, page turning or marking, and is applicable to a lightweight office scenario. The user may operate, by using the stylus, display content, or the like on the electronic device, and all operation effects can be truly reflected on the large display, to improve operation convenience of the user.

The foregoing describes in detail the method in the embodiments of this application. The following provides apparatuses in the embodiments of this application.

Figure 6:
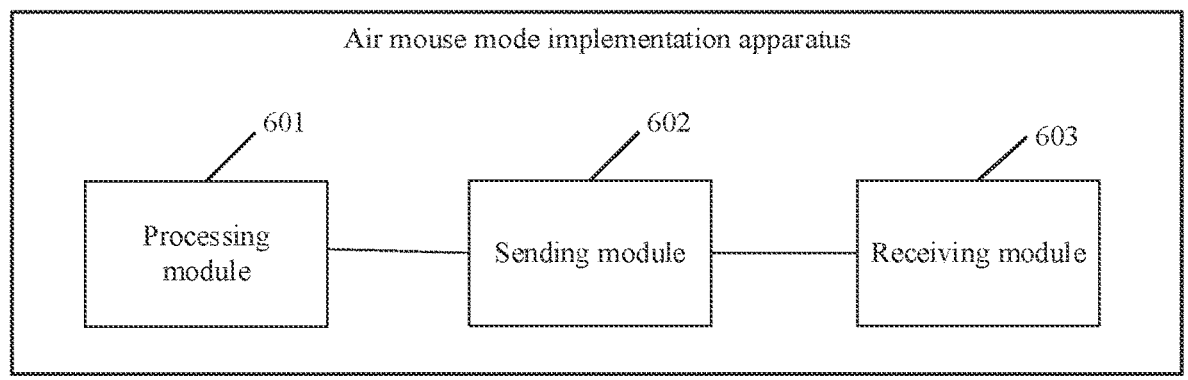
FIG. 6 is a schematic diagram of a structure of an air mouse mode implementation apparatus according to an embodiment of this application.

FIG. 6 is a schematic diagram of a structure of an air mouse mode implementation apparatus according to an embodiment of this application. The air mouse mode implementation apparatus may include a processing module 601, a sending module 602, and a receiving module 603. Detailed descriptions of the modules are as follows.

The processing module 601 is configured to establish a communication connection to a stylus through Bluetooth.

The sending module 602 is configured to send notification information to the stylus through the communication connection when a screen casting event of an electronic device is detected. The notification information is used to indicate whether the stylus is to enter an air mouse mode.

The receiving module 603 is configured to receive a determining instruction sent by the stylus.

The processing module 601 is further configured to: enter the air mouse mode based on the determining instruction, and modify, from an arrow icon to a dot icon, an indication icon corresponding to the stylus.

Optionally, the receiving module 603 is further configured to receive a page turning instruction sent by the stylus through the communication connection.

The processing module 601 is further configured to perform page turning on a current page of a screen casting interface based on the page turning instruction.

Optionally, the receiving module 603 is further configured to receive a marking instruction sent by the stylus through the communication connection.

The processing module 601 is further configured to mark display content of the screen casting interface based on the marking instruction.

Optionally, the processing module 601 is further configured to: when it is detected that the screen casting event ends, exit the air mouse mode, and modify, from the dot icon to the arrow icon, the indication icon corresponding to the stylus.

Optionally, the receiving module 603 is further configured to receive a switching instruction sent by the stylus through the communication connection; and the processing module 601 is further configured to: exit the air mouse mode, and modify, from the dot icon to the arrow icon, the indication icon corresponding to the stylus.

It should be noted that, for an implementation of each module, correspondingly refer to corresponding descriptions of the method embodiment shown in FIG. 3, and the module performs the method and the function performed by the electronic device in the foregoing embodiment.

Figure 7:
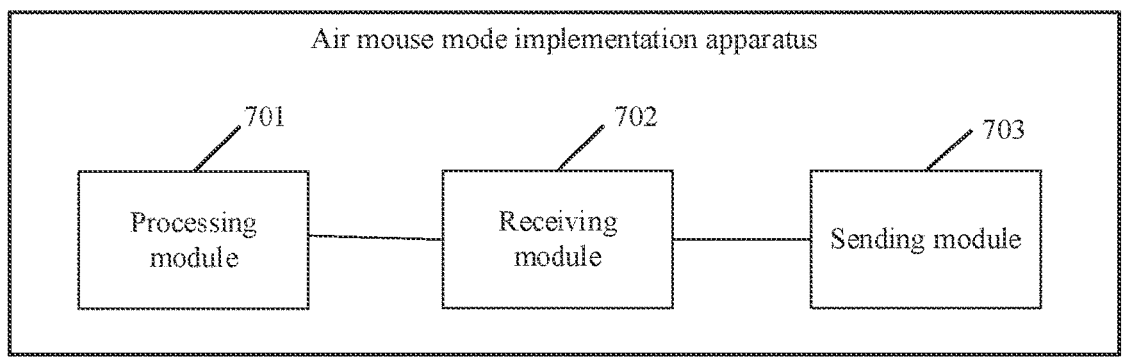
FIG. 7 is a schematic diagram of a structure of another air mouse mode implementation apparatus according to an embodiment of this application.

FIG. 7 is a schematic diagram of a structure of another air mouse mode implementation apparatus according to an embodiment of this application. The air mouse mode implementation apparatus may include a processing module 701, a sending module 702, and a receiving module 703. Detailed descriptions of the modules are as follows.

The processing module 701 is configured to establish a communication connection to an electronic device through Bluetooth.

The receiving module 702 is configured to receive notification information sent by the electronic device through the communication connection. The notification information is used to indicate whether a stylus is to enter an air mouse mode, and the notification information is sent by the electronic device when the electronic device detects a screen casting event.

The sending module 703 is configured to send a determining instruction to the electronic device through the communication connection. The determining instruction is used to indicate the electronic device to enter the air mouse mode, and to modify, from an arrow icon to a dot icon, an indication icon corresponding to the stylus.

Optionally, the sending module 703 is configured to send a page turning instruction to the electronic device through the communication connection. The page turning instruction is used to indicate the electronic device to perform page turning on a current page of a screen casting interface.

Optionally, the sending module 703 is configured to send a marking instruction to the electronic device through the communication connection. The marking instruction is used to indicate the electronic device to mark display content of a screen casting interface.

Optionally, the sending module 703 is configured to send a switching instruction to the electronic device through the communication connection. The switching instruction is used to indicate the electronic device to exit the air mouse mode, and to modify, from the dot icon to the arrow icon, the indication icon corresponding to the stylus.

It should be noted that, for an implementation of each module, correspondingly refer to corresponding descriptions of the method embodiment shown in FIG. 3, and the module performs the method and the function performed by the stylus in the foregoing embodiment.

Figure 8:
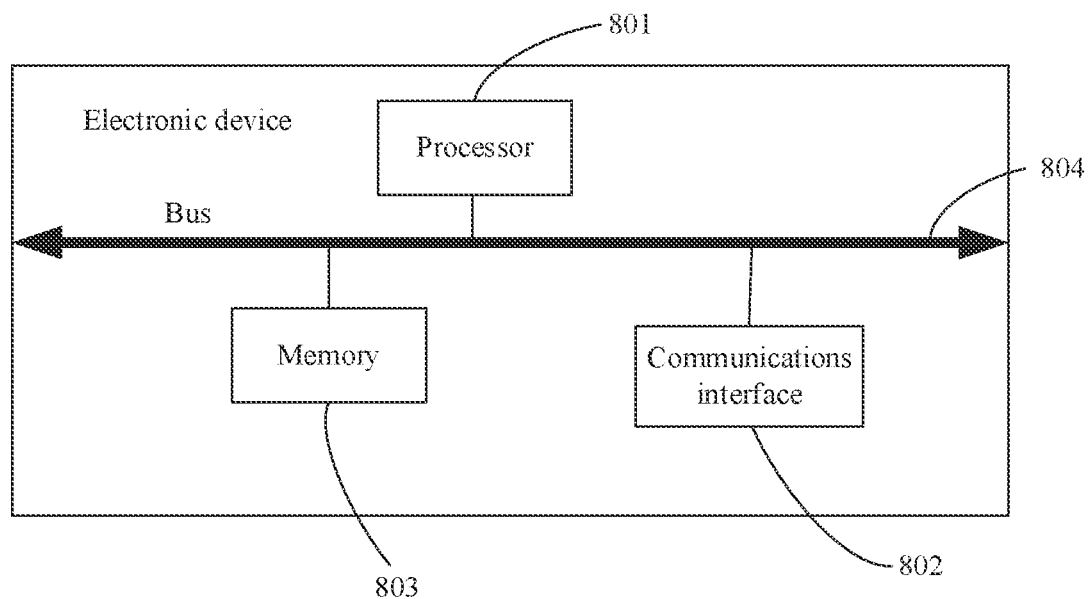
FIG. 8 is a schematic diagram of a structure of an electronic device according to an embodiment of this application.

Continue to refer to FIG. 8. FIG. 8 is a schematic diagram of a structure of an electronic device according to an embodiment of this application. As shown in FIG. 8, the electronic device may include at least one processor 801, at least one communications interface 802, at least one memory 803, and at least one communications bus 804.

The processor 801 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications bus 804 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 8, but this does not mean that there is only one bus or only one type of bus. The communications bus 804 is configured to implement communication connection between these components. The communications interface 802 of the device in this embodiment of this application is configured to perform signaling or data communication with another node device. The memory 803 may include a volatile memory, for example, a nonvolatile dynamic random access memory (nonvolatile random access memory, NVRAM), a phase-change random access memory (phase-change RAM, PRAM), or a magnetoresistive random access memory (magnetoresistive RAM, MRAM); or may include a nonvolatile memory, for example, at least one magnetic disk storage device, an electrically erasable programmable read-only memory (electrically erasable programmable read-only memory, EEPROM), a flash memory device such as a NOR flash memory (NOR flash memory) or a NAND flash memory (NAND flash memory), or a semiconductor device such as a solid-state drive (solid-state drive, SSD). Optionally, the memory 803 may alternatively be at least one storage apparatus that is far away from the processor 801. Optionally, the memory 803 may further store a group of program code. Optionally, the processor 801 may further execute a program executed in the memory 803, to perform the following operations:

establishing a communication connection to a stylus through Bluetooth;

sending notification information to the stylus through the communication connection when detecting a screen casting event of the electronic device, where the notification information is used to indicate whether the stylus is to enter an air mouse mode;

receiving a determining instruction sent by the stylus through the communication connection; and entering the air mouse mode based on the determining instruction, and modifying, from an arrow icon to a dot icon, an indication icon corresponding to the stylus.

Optionally, the processor 801 is further configured to:

receive a page turning instruction sent by the stylus through the communication connection; and perform page turning on a current page of a screen casting interface based on the page turning instruction.

Optionally, the processor 801 is further configured to:

receive a marking instruction sent by the stylus through the communication connection; and mark display content of the screen casting interface based on the marking instruction.

Optionally, the processor 801 is further configured to:

when detecting that the screen casting event ends, exit the air mouse mode, and modify, from the dot icon to the arrow icon, the indication icon corresponding to the stylus.

Optionally, the processor 801 is further configured to:

receive a switching instruction sent by the stylus through the communication connection; and exit the air mouse mode, and modify, from the dot icon to the arrow icon, the indication icon corresponding to the stylus.

Further, the processor may further cooperate with the memory and the communications interface, to perform an operation of the electronic device in the foregoing embodiments of this application.

Figure 9:
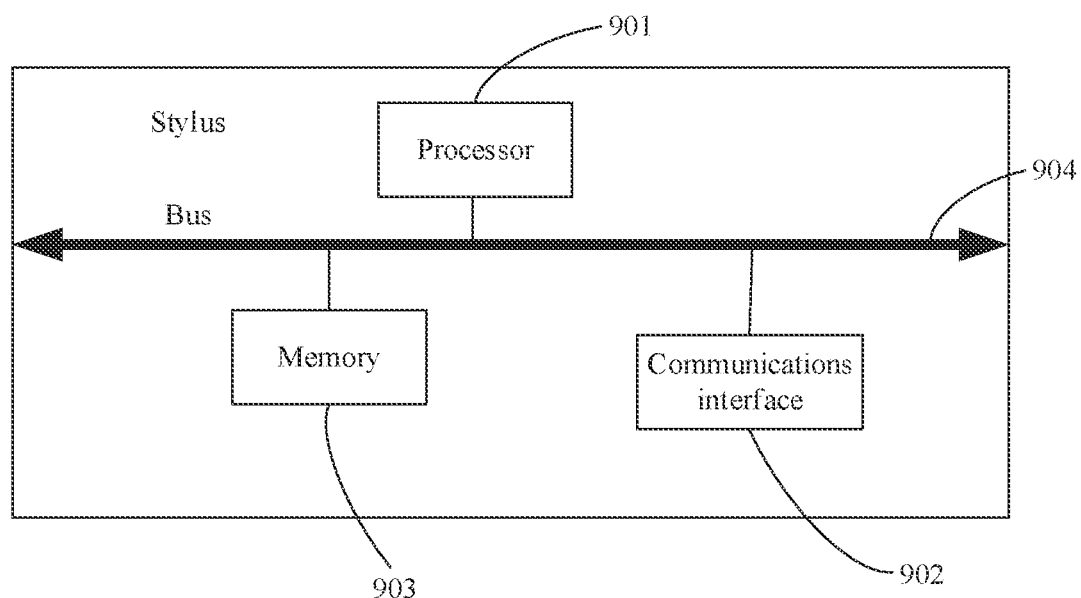
FIG. 9 is a schematic diagram of a structure of a stylus according to an embodiment of this application.

Continue to refer to FIG. 9. FIG. 9 is a schematic diagram of a structure of a stylus according to an embodiment of this application. As shown in the figure, the stylus may include at least one processor 901, at least one communications interface 902, at least one memory 903, and at least one communications bus 904.

The processor 901 may be processors of various types that are mentioned above. The communications bus 904 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 9, but this does not mean that there is only one bus or only one type of bus. The communications bus 904 is configured to implement communication connection between these components. The communications interface 902 of the device in this embodiment of this application is configured to perform signaling or data communication with another node device. The memory 903 may be memories of various types mentioned above. Optionally, the memory 903 may alternatively be at least one storage apparatus far away from the processor 901. The memory 903 stores a group of program code, and the processor 901 executes a program executed by the OAM in the memory 903, to perform the following operations:

establishing a communication connection to an electronic device through Bluetooth;

receiving notification information sent by the electronic device through the communication connection, where the notification information is used to indicate whether the stylus is to enter an air mouse mode, and the notification information is sent by the electronic device when the electronic device detects a screen casting event; and sending a determining instruction to the electronic device through the communication connection, where the determining instruction is used to indicate the electronic device to enter the air mouse mode, and to modify, from an arrow icon to a dot icon, an indication icon corresponding to the stylus.

Optionally, the processor 901 is further configured to:

send a page turning instruction to the electronic device through the communication connection, where the page turning instruction is used to indicate the electronic device to perform page turning on a current page of a screen casting interface.

Optionally, the processor 901 is further configured to:

send a marking instruction to the electronic device through the communication connection, where the marking instruction is used to indicate the electronic device to mark display content of a screen casting interface.

Optionally, the processor 901 is further configured to:

send a switching instruction to the electronic device through the communication connection, where the switching instruction is used to indicate the electronic device to exit the air mouse mode, and to modify, from the dot icon to the arrow icon, the indication icon corresponding to the stylus.

Further, the processor may further cooperate with the memory and the communications interface, to perform an operation of the stylus in the foregoing embodiments of this application.

An embodiment of this application further provides a chip system. The chip system includes a processor, configured to support an electronic device or a stylus to implement a function in any one of the foregoing embodiments, for example, generating or processing data and/or information in the foregoing method. In a possible design, the chip system may further include a memory. The memory is configured to store a program instruction and data that are necessary for the electronic device or the stylus. The chip system may include a chip, or may include a chip and another discrete component.

An embodiment of this application further provides a processor, configured to be coupled to a memory, to perform any method and function of an electronic device or a stylus in any one of the foregoing embodiments.

An embodiment of this application further provides a computer program product including instructions. When the computer program product runs on a computer, the computer is enabled to perform any method and function of an electronic device or a stylus in any one of the foregoing embodiments.

An embodiment of this application further provides an apparatus, configured to perform any method and function of an electronic device or a stylus in any one of the foregoing embodiments.

All or some of the foregoing embodiments may be implemented by software, hardware, firmware, or any combination thereof. When the software is used to implement the embodiments, the embodiments may be implemented entirely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A method implemented by an electronic device, wherein the method comprises:

establishing a communication connection to a stylus;

sending notification information to the stylus through the communication connection when detecting a screen casting event of the electronic device, wherein the notification information instructs the stylus to enter an air mouse mode;

receiving, from the stylus through the communication connection, a determining instruction;

entering, based on the determining instruction, the air mouse mode; and modifying, in response to entering the air mouse mode, an indication icon corresponding to the stylus from an arrow icon to a dot icon.

2. The method of claim 1, wherein after entering the air mouse mode, the method further comprises:

receiving, from the stylus through the communication connection, a page turning instruction; and performing, based on the page turning instruction, page turning on a current page of a screen casting interface.

3. The method of claim 1, wherein after entering the air mouse mode, the method further comprises:

receiving, from the stylus through the communication connection, a marking instruction; and marking, based on the marking instruction, a display content of a screen casting interface.

4. The method of claim 1, wherein after entering the air mouse mode, the method further comprises:

detecting that the screen casting event has ended;

exiting, in response to detecting that the screen casting event has ended, the air mouse mode; and modifying, in response to detecting that the screen casting event has ended, the indication icon from the dot icon to the arrow icon.

5. The method of claim 1, wherein after entering the air mouse mode, the method further comprises:

receiving, from the stylus through the communication connection, a switching instruction;

exiting, in response to the switching instruction, the air mouse mode; and modifying, in response to the switching instruction, the indication icon from the dot icon to the arrow icon.

6. A method implemented by a stylus, wherein the method comprises:

establishing a communication connection to an electronic device;

receiving, from the electronic device through the communication connection, notification information instructing the stylus is to enter an air mouse mode; and sending, to the electronic device through the communication connection, a determining instruction instructing the electronic device to enter the air mouse mode and to modify an indication icon corresponding to the stylus from an arrow icon to a dot icon.

7. The method of claim 6, wherein after sending the determining instruction, the method further comprises sending, to the electronic device through the communication connection, a page turning instruction instructing the electronic device to perform page turning on a current page of a screen casting interface.

8. The method of claim 6, wherein after sending the determining instruction, the method further comprises sending, to the electronic device through the communication connection, a marking instruction instructing the electronic device to mark a display content of a screen casting interface.

9. The method of claim 6, wherein after sending the determining instruction, the method further comprises sending, to the electronic device through the communication connection, a switching instruction instructing the electronic device to exit the air mouse mode and to modify the indication icon from the dot icon to the arrow icon.

10. An electronic device comprising:

a memory configured to store instructions; and a processor coupled to the memory, wherein the instructions cause the processor to be configured to:

establish a communication connection to a stylus;

send notification information to the stylus through the communication connection when detecting a screen casting event of the electronic device, wherein the notification information instructs the stylus to enter an air mouse mode;

receive, from the stylus through the communication connection, a determining instruction;

enter, based on the determining instruction, the air mouse mode; and modify, in response to entering the air mouse mode, an indication icon corresponding to the stylus from an arrow icon to a dot icon.

11. A stylus comprising:

a memory configured to store instructions; and a processor coupled to the memory, wherein the instructions cause the processor to be configured to:

establish a communication connection to an electronic device;

receive, from the electronic device through the communication connection when detecting a screen casting event, notification information instructing the stylus to enter an air mouse mode; and send, to the electronic device through the communication connection, a determining instruction instructing the electronic device to enter the air mouse mode and to modify an indication icon corresponding to the stylus from an arrow icon to a dot icon.

12. A non-transitory computer-readable medium that stores executable instructions that, when executed by a processor, cause an electronic device to:

establish a communication connection to a stylus;

send notification information to the stylus through the communication connection when detecting a screen casting event of the electronic device, wherein the notification information instructs the stylus to enter an air mouse mode;

receive, from the stylus through the communication connection, a determining instruction;

enter, based on the determining instruction, the air mouse mode; and modify, in response to entering the air mouse mode, an indication icon corresponding to the stylus from an arrow icon to a dot icon.

13. The non-transitory computer-readable medium of claim 12, wherein the computer-executable instructions further cause the electronic device to:

receive, from the stylus through the communication connection, a page turning instruction; and perform, based on the page turning instruction, page turning on a current page of a screen casting interface.

14. The electronic device of claim 10, wherein the instructions further cause the processor to be configured to:

receive, from the stylus through the communication connection, a page turning instruction; and perform, based on the page turning instruction, page turning on a current page of a screen casting interface.

15. The electronic device of claim 10, wherein the instructions further cause the processor to be configured to:

receive, from the stylus through the communication connection, a marking instruction; and mark, based on the marking instruction, a display content of a screen casting interface.

16. The electronic device of claim 10, wherein the instructions further cause the processor to be configured to:

detect that the screen casting event has ended;

exit, in response to detecting that the screen casting event has ended, the air mouse mode; and modify, in response to detecting that the screen casting event has ended, the indication icon from the dot icon to the arrow icon.

17. The electronic device of claim 10, wherein the instructions further cause the processor to be configured to:

receive, from the stylus through the communication connection, a switching instruction;

exiting, in response to the switching instruction, the air mouse mode; and modify, in response to the switching instruction, the indication icon from the dot icon to the arrow icon.

18. The stylus of claim 11, wherein the instructions further cause the processor to be configured to send, to the electronic device through the communication connection, a page turning instruction instructing the electronic device to perform page turning on a current page of a screen casting interface.

19. The stylus of claim 11, wherein the instructions further cause the processor to be configured to send, to the electronic device through the communication connection, a marking instruction instructing the electronic device to mark a display content of a screen casting interface.

20. The stylus of claim 11, wherein the instructions further cause the processor to be configured to send, to the electronic device through the communication connection, a switching instruction instructing the electronic device to exit the air mouse mode and to modify the indication icon from the dot icon to the arrow icon.

\* \* \* \* \*